United States Patent [19]
Uchida

[11] Patent Number: 4,786,846
[45] Date of Patent: Nov. 22, 1988

[54] LEVEL GUAGE APPARATUS

[75] Inventor: Mitsuru Uchida, Tokyo, Japan

[73] Assignee: Sakura Instrument Co., Ltd., Tokyo, Japan

[21] Appl. No.: 65,321

[22] Filed: Jun. 22, 1987

[30] Foreign Application Priority Data

Jul. 9, 1986 [JP] Japan .................................. 61-161464

[51] Int. Cl.[4] ............................................. G01F 23/46
[52] U.S. Cl. .................................. 318/482; 73/290 R; 73/313
[58] Field of Search ................ 318/482; 340/618, 623; 73/305, 309, 313, 319, 321, 322, 290 R, 296, 301, 314

[56] References Cited

U.S. PATENT DOCUMENTS

| 2,567,823 | 11/1951 | Needham | 318/482 X |
| 4,244,219 | 1/1981 | Takalashi | 73/309 |
| 4,422,328 | 12/1983 | Luchessa et al. | 73/321 X |

Primary Examiner—Bentsu Ro
Attorney, Agent, or Firm—Bauer & Schaffer

[57] ABSTRACT

A self-balancing type level gauge apparatus is disclosed, in which the change of a magnetic flux generated between coupling outer and inner magnet rings on the basis of a displacement between the coupling outer and inner magnet rings due to the displacement of a liquid level to be gauged is converted to an electrical signal which is used to gauge the liquid level to thereby reduce the mechanical portion which causes a mechanical friction so that the level gauge apparatus can be improved considerably in level gauging detection sensitivity.

11 Claims, 3 Drawing Sheets

F/G. 1 (PRIOR ART)

LEVEL GUAGE APPARATUS

BACKGROUND OF THE INVENTION

1. Field of the Invention

This invention relates generally to level gauge or measuring apparatus and, more particularly, is directed to a level gauge apparatus suitable to detect or gauge the liquid level or the level of the interface between different kinds of liquids such as water, oil and so on, for example, within a tank.

2. Description of the Prior Art

FIG. 1 is a partially exploded perspective view illustrating a construction of a known level gauge apparatus. Referring to FIG. 1, an example of the prior art level gauge apparatus will be described hereinafter.

As shown in FIG. 1, there is provided a float or displacer 1 that is movably suspended by a wire 2 so as to float on the surface of a liquid or the liquid level (not shown). This wire 2 is wound around a wire drum 3 and can be supplied therefrom and/or rewound therearound. The wire drum 3 is rotatably supported at its bottom 3a by a detection shaft 8. When the liquid level on which the displacer 1 is floated is changed and hence the displacer 1 is moved up and down in response to the change of the liquid level, the tension applied from the wire 2 to the wire drum 3 is changed. This change of tension given by the wire 2 is converted through a coupling outer magnet ring 4 fixed at its one end to the bottom 3a of the wire drum 3 being coaxial with respect to the shaft 8 and a coupling inner magnet ring 5 fixed at its center to the shaft 8 within the ring-shaped magnet 4, to the torque of the detection shaft 8. This torque of the detection shaft 8 displaces through a metal member 9 that is fixed to the detection shaft 8 balance springs 11 one ends of which are fixed to the metal member 9, respectively. While, the metal member 9 and the balance springs 11 are shown to be distant apart from a worm wheel 13 which is rotatably supported by the detection shaft 8 in FIG. 1 for better understanding, the metal member 9 is fixed to one side surface of the worm wheel 13 and the other ends of the balance springs 11 are fixed through L-shaped metal members 12 to the same surface of the worm wheel 13, in practice.

The displacement of the balance springs 11 is converted to an electrical signal by a magnet 10 fixed to the metal member 9 and an electromagnetic transducer 14 attached to the surface of the worm wheel 13 at the position corresponding to the magnet 10. The electrical signal from the electromagnetic transducer 14 is transmitted through a slip ring 16 fixed to the detection shaft 8 to a servo amplifier 17 and thereby amplified. The electrical signal amplified thereby is supplied to a motor 18 and its rotation or drive shaft 19 rotates through a worm 20 which is formed on the outer surface of the drive shaft 19, the worm wheel 13 which meshes with the worm 20 in the positive or reverse direction in response to the displacement of the liquid level. When the liquid level for the displacer 1 is not displaced any more, they stop rotating, the equilibrium state then being kept. While, the rotation of the drive shaft 19 operates a level gauge counter 22 through a belt 21 and thereby the value of the liquid level gauged can be displayed on the level gauge counter 22 when the displacer 1 is settled. There are provided a pair of bearings 6 and 7 that are used to support the detection shaft 8 rotatably. Further, there is provided a ball bearing 15 to allow the detection shaft 8 and the worm wheel 13 to be rotated freely and reciprocally.

By the way, the above mentioned known level gauge apparatus must be constructed such that the detection shaft 8 and the worm wheel 13 can be freely rotated by using the ball bearing 15 or the like. Inevitably, this makes the known level gauge apparatus become complicated in construction and high in cost. Further, due to the mechanical friction generated among the detection shaft 8 and the bearings 6 and 7 for supporting the detection shaft 8 and the mechanical friction generated among the detection shaft 8, the ball bearing 15 and the worm wheel 13, the known level gauge apparatus is degraded in mechanical detection sensitivity to detect that the tension applied to the wire drum 3 by the wire 2 is changed when the liquid level is displaced. For this reason, the prior art level gauge apparatus can not increase its mechanical detection sensitivity. Further, the prior art level gauge apparatus can not effectively utilize the most-advanced servo amplifier which is highly stable and high in amplification factor. Thus, it can not be expected that the known level gauge apparatus will be enhanced more in mechanical detection sensitivity.

OBJECTS AND SUMMARY OF THE INVENTION

Accordingly, it is a general object of this invention to provide an improved level gauge apparatus which can overcome the shortcomings encountered with the prior art.

It is an object of this invention to provide a level gauge apparatus which can be simplified in construction and which can be manufactured at low cost.

It is another object of this ihvention to provide a level gauge apparatus which can improve its mechanical detection sensitivity considerably.

It is still another object of this invention to provide a level gauge apparatus which can be prevented from being affected by a hysteresis, a secular variation of a balance spring, etc.

It is a further object of this invention to provide a level gauge apparatus which can effectively utilize a servo amplifier which is high in stability and in amplification factor.

It is a still further object of this invention to provide a level gauge apparatus which can measure the liquid level with high accuracy.

It is yet further object of this invention to provide a level gauge apparatus in which a displacer can be considerably miniaturized in size as compared with that of the prior art.

According to one aspect of the present invention, there is provided a level gauge apparatus comprising:
(a) a displacer suspended by a gauge wire over the liquid level to be gauged;
(b) a detection shaft;
(c) a wire drum around which said wire is wound and which is rotatably supported by said detection shaft;
(d) a coupling outer magnet ring fixed to said wire drum;
(e) a coupling inner magnet ring fixed to said detection shaft;
(f) an electromagnetic transducer fixed to said coupling inner magnet ring; and
(g) means for rotating said detection shaft by the output of said electromagnetic transducer, wherein when such a force is generated to cause a displacement between said coupling outer and inner magnet rings due to a displacement of said liquid level to be gauged, a change of a magnetic flux generated between said coupling outer and inner magnet rings is converted to an electrical signal by said electromagnetic transducer and said detection shaft is rotated by said electrical signal so as to remove the displacement between said coupling outer and inner magnet rings and a gauged value of said liquid level is obtained.

These and other objects, features and advantages of the present invention will become apparent from the following detailed description of the preferred embodiment taken in conjunction with the accompanying drawing, in which like reference numerals identify like elements and parts.

DESCRIPTION OF THE PREFERRED EMBODIMENT

Now, an embodiment of a level gauge apparatus according to the present invention will hereinafter be described in detail with reference to the drawings.

Figure 1:
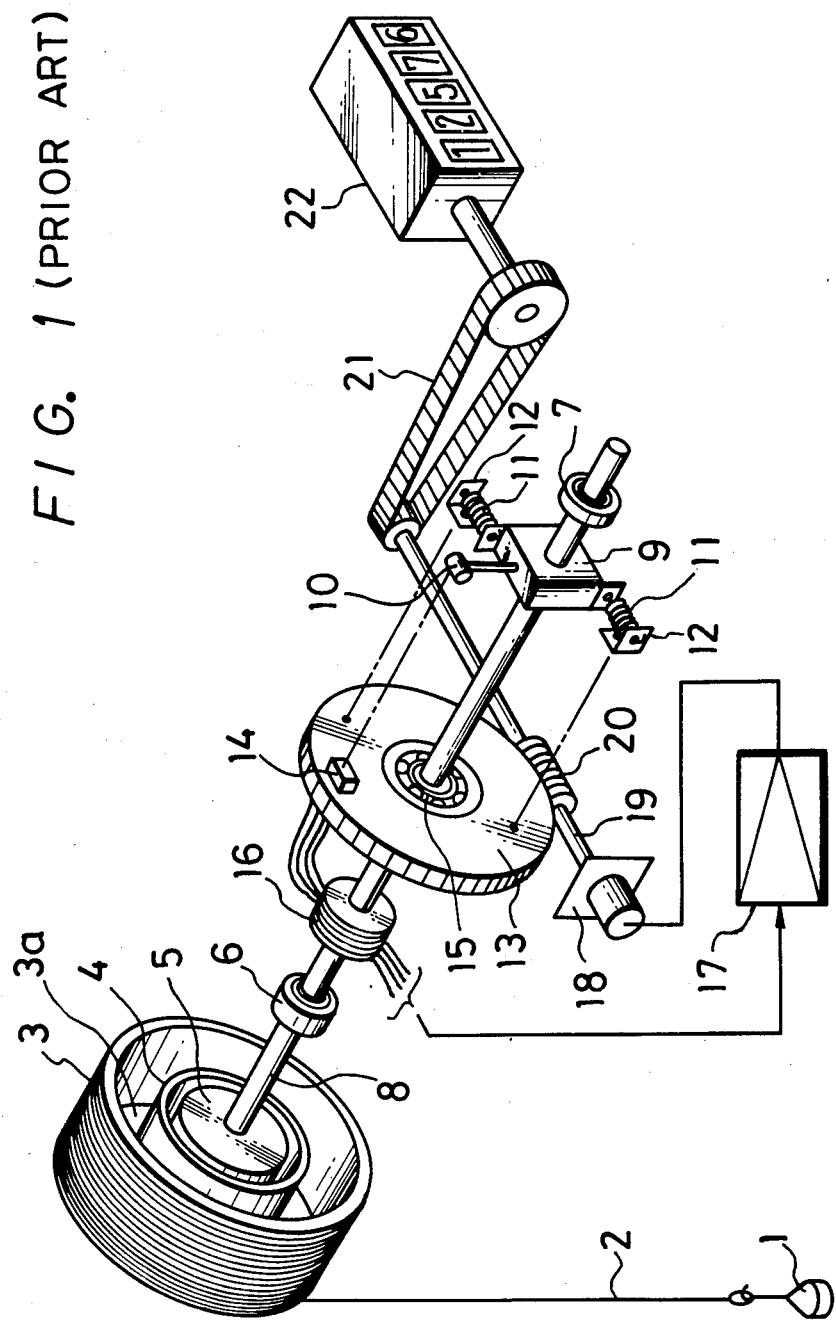
FIG. 1 is a partially exploded perspective view illustrating an example of a known level gauge apparatus.
Figure 2:
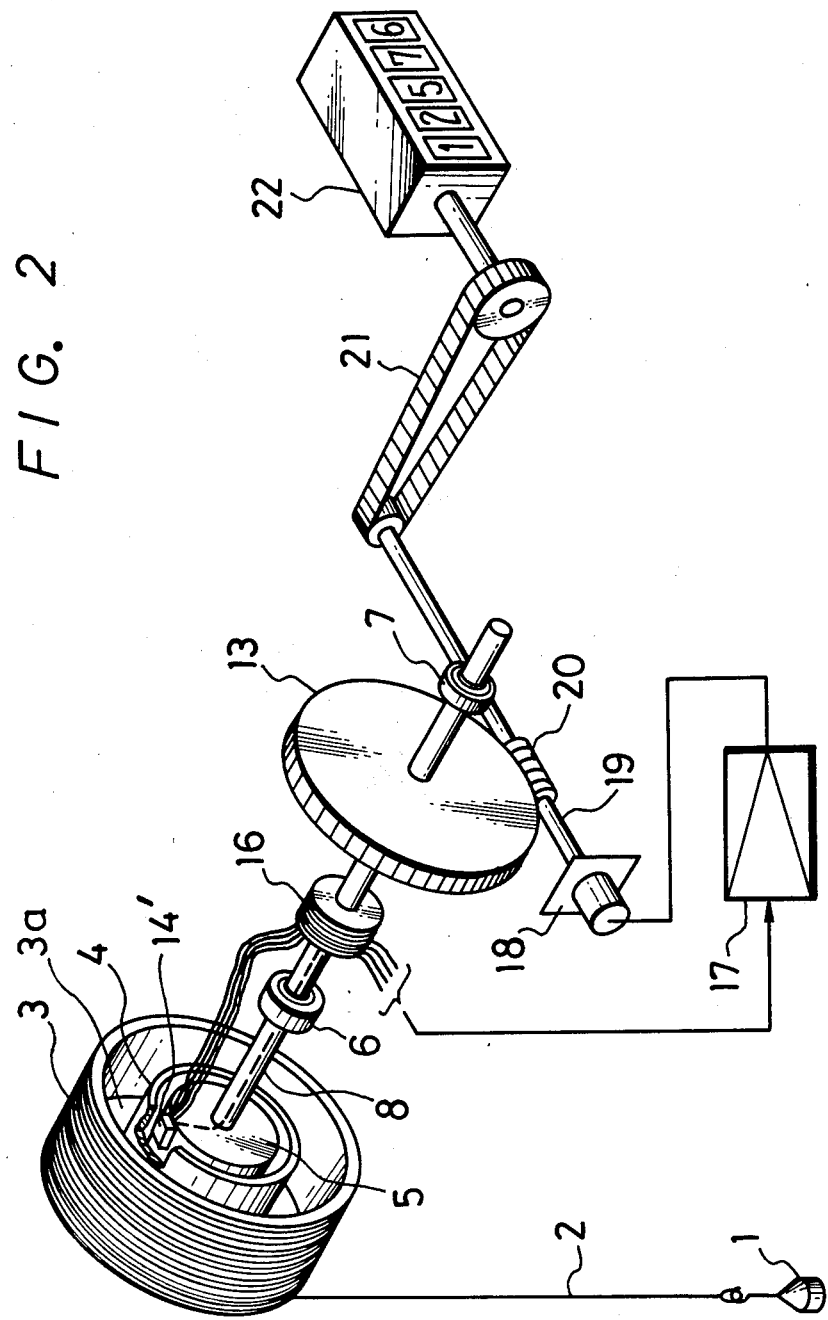
FIG. 2 is a partially exploded perspective view illustrating an embodiment of a level gauge apparatus according to the present invention.
Figure 3A:
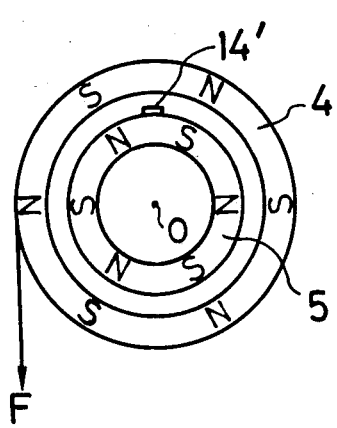
FIGS. 3A to 3C are respectively front views used to explain the operation of the level gauge apparatus of the invention shown in FIG. 2.
Figure 3B:
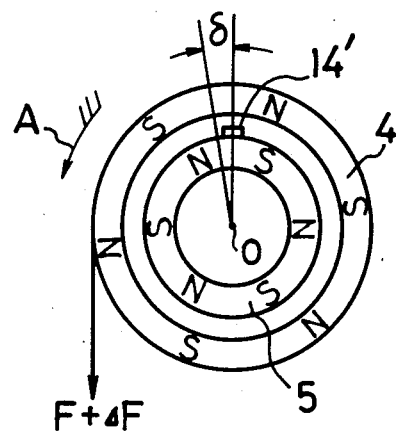
Figure 3C:
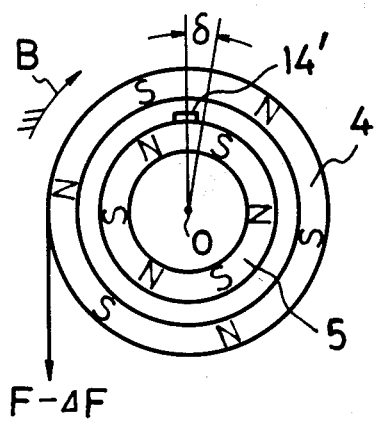

FIG. 2 is a perspective view showing an embodiment of the level gauge apparatus according to the present invention. FIGS. 3A to 3C are front views respectively used to explain the operation of the level gauge apparatus shown in FIG. 2. In FIG. 2, like parts corresponding to those of FIG. 1 are marked with the same references and will not be described in detail.

Referring to FIG. 2, the displacer 1 is suspended over the liquid level (not shown) to be detected by the wire 2 and this wire 2 is wound around the wire drum 3 and can be supplied therefrom and/or rewound therearound similarly to the prior art level gauge apparatus as earlier described in relation to FIG. 1. The cylindrical-shaped coupling outer magnet ring 4 is fixed in the inside of the wire drum 3 to its bottom surface 3a and magnetic poles N and S are alternately formed by magnetizing the coupling outer magnet ring 4 along its circumferential direction (see FIG. 3). The coupling inner magnet ring 5 is coupled to the detection shaft 8 and magnetic poles N and S of the number same as that of the magnetic poles N and S of the coupling outer magnet ring 4 are alternately formed by magnetizing the outer peripheral portion of the coupling inner magnet ring 5. An electromagnetic transducer 14' is fixed to the outer periphery of the coupling inner magnetic ring 5 at the boundary portion between the different magnetic poles as shown in FIG. 3. For better understanding, the coupling outer magnet ring 4 is cut away in part to show the electromagnetic transducer 14' in FIG. 2. While four lead wires of the electromagnetic transducer 14' are connected to the slip ring 16 at the outside of the detection shaft 8 as shown in FIG. 1, they are connected, in practice, through the inside of the detection shaft 8 to the slip ring 16 as shown by a broken line in FIG. 2. The worm wheel 13 is directly fixed to the detection shaft 8 without the ball bearing 15 unlike the prior art shown in FIG. 1. In FIG. 2, other portions corresponding to those of FIG. 1 are marked with the same references and will not be described here.

Subsequently, the operation of the level gauge apparatus of the invention shown in FIG. 2 are explained hereinbelow with reference to FIGS. 3A to 3C.

FIG. 3A is a front view illustrating the states of the coupling outer and inner magnet rings 4 and 5 when a tension F given by the wire 2 is not changed; FIG. 3B is a front view illustrating the states of the coupling outer and inner magnet rings 4 and 5 when the tension F given by the wire 2 is changed to $F+\Delta F$; and FIG. 3C is a front view illustrating the states of the coupling outer and inner magnet rings 4 and 5 when the tension F given by the wire 2 is changed to $F-\Delta F$.

When the displacer 1 and so on are in equilibrium state, the magnetic poles S and N of both the coupling outer and inner magnet rings 4 and 5 are opposed to each other on the radius passing through the common center O thereof as shown in FIG. 3A and the coupling force oriented along the radial direction acts between both the coupling outer and inner magnet rings 4 and 5 so that the coupling outer and inner magnet rings 4 and 5 are both settled. If now the liquid level is, for example, lowered to break the equilibrium state and the displacer 1 is moved downward to change the tension F given by the wire 2 to $F+\Delta F$ as shown in FIG. 3B, the rotation force in the direction shown by an arrow A in FIG. 3B acts on the coupling outer magnet ring 4. While, since the coupling inner magnet ring 5 is kept settled so long as the worm 20 and the worm wheel 13 are not rotated by the motor 18, by the change $\Delta F$ of the tension given by the wire 2, the coupling magnet outer ring 4 is displaced relative to the coupling inner magnet ring 5 by a very small amount $\delta$ in the direction shown by the arrow A in FIG. 3B. As a result, the magnetic flux passing the electromagnetic transducer 14' fixed to the coupling inner magnet ring 5 is changed as compared with the state shown in FIG. 3A so that the change of the electrical signal corresponding to the change $\Delta F$ of the tension given by the wire 2 appears in the output of the electromagnetic transducer 14'. If the electromagnetic transducer 14' is adjusted such that the output of the electromagnetic transducer 14' becomes zero under the state shown in FIG. 3A, the electromagnetic transducer 14' generates an electrical signal corresponding to the change $\Delta F$ of the tension given by the wire 2. Turning back to FIG. 2, this electrical signal is supplied through the slip ring 16 to the servo amplifier 17 in which it is amplified so as to rotate the motor 18. The rotation of the motor 18 rotates through the drive shaft 19, the worm 20 and the worm wheel 13 the detection shaft 8, accordingly, the coupling inner magnet ring 5 in the direction following the coupling outer magnet ring 4 in response to the change $\Delta F$ of the tension given by the wire 2. When the displacement $\delta$ between both the coupling outer and inner magnet rings 4 and 5 becomes zero, the output of the electromagnetic transducer 14' becomes zero. At this time point, the displacement of the displacer 1 relative to the liquid level becomes zero and the motor 18 stops rotating, thus keeping the equilibrium state again. During the period of reaching to this equilibrium condition, the motor 18 rotates the level gauge counter 22 through the drive shaft 19 and the belt 21 thereby to indicate the value of the level measured or gauged when the coupling inner and outer magnet rings 5 and 4 are both settled.

When the liquid level is, for example, raised from the equilibrium state and the displacer 1 is moved upward to change the tension F given by the wire 2 to F−ΔF, a rotation force oriented in the direction opposite to the direction shown by the arrow A acts on the coupling outer magnet ring 4 as shown by an arrow B in FIG. 3C. Consequently, due to the change ΔF of the tension given by the wire 2, a displacement −δ in the opposite direction to the case of FIG. 3B occurs between the coupling outer and inner magnet rings 4 and 5 so that the magnetic flux is changed oppositely to that shown in FIG. 3B. Hence, the electromagnetic transducer 14' generates an electrical signal with the opposite polarity to that shown in FIG. 3B and corresponding to the change ΔF of the tension given by the wire 2. Similarly as earlier noted, all movements in the opposite direction to those in FIG. 3B are presented and the equilibrium state is again presented.

Figure 4:
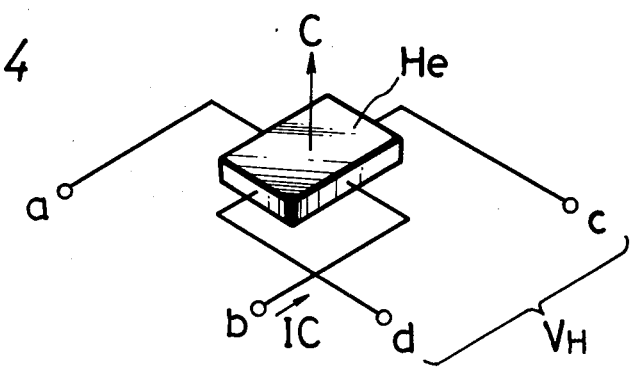
FIG. 4 is a perspective view illustrating an example of an electromagnetic transducer element used in the present invention.

A Hall element, a magnetoresistance element or so-called search coil may be used as the electromagnetic transducer 14'. In this case, the Hall element used as the electromagnetic transducer 14' will be described hereinafter with reference to FIG. 4. FIG. 4 is a perspective view illustrating the fundamental structure of a Hall element He.

Referring to FIG. 4, there are provided for the Hall element He input terminals a and b and output terminals c and d, respectively. When a control current IC is supplied through the input terminals a and b to the Hall element He to generate therefrom a magnetic field C vertical to the surface of the Hall element He, a Hall voltage $V_H$ proportional to the product of the magnetic field C and the control current IC is generated across the output terminals c and d. If the control current IC is selected to be constant, the Hall voltage $V_H$ becomes proportional to the magnetic field C. Accordingly, if the Hall voltage $V_H$ provided under the condition shown in FIG. 3A, that is, under the equilibrium state is adjusted so as to become zero Volt, the Hall voltage $V_H$ under the condition shown in FIG. 3B becomes, for example, a negative voltage; and the Hall voltage $V_H$ under the condition shown in FIG. 3C becomes a positive voltage. When this voltage is amplified by the servo amplifier 17 and the motor 18 is rotated in the positive or negative direction such that the Hall voltage $V_H$ becomes zero Volt, even if the liquid level is displaced relative to the displacer 1 and the tension F given by the wire 2 is changed, the equilibrium condition can be recovered immediately and automatically.

While the liquid level is gauged as described above by way of example, the level gauge apparatus of the invention is applied to other cases where the level of the interface between two different kinds of liquids, such as, oil, water and so on is gauged.

As will be clear from the above mentioned explanation, the present invention can achieve the following remarkable effects.

The level gauge apparatus of this invention can be simplified in construction and manufactured at low cost.

In the level gauge apparatus of the invention, the mechanical friction is produced only in the wire drum side so that the level gauge apparatus can be considerably improved in mechanical detection sensitivity.

Since the level gauge apparatus of the invention employs no balance spring, the level gauge apparatus can be prevented from being affected by a hysteresis, a secular variation and the like of the balance spring.

Further, since the level gauge apparatus of the invention can effectively utilize the servo amplifier that is most-advanced in electronics technology so as to become high in stability and in amplification factor, the liquid level can be measured with very high detection sensitivity and high accuracy.

Furthermore, since the level gauge apparatus of the invention is increased in the detection sensitivity greatly, the displacer used therein can be miniaturized in size as compared with that of the known level gauge apparatus.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

I claim as my invention:

1. A liquid level gauge apparatus comprising:
   (a) a detection shaft;
   (b) a drum rotatably journalled about said shaft having a wire wound about its outer surface;
   (c) a displacer suspended at the end of said wire to float on the liquid surface to be sensed and to cause rotation of said drum relative to said shaft in response to the displacement of said displacer;
   (d) a magnetic coupling between said shaft and drum comprising an outer magnet ring fixed to said drum and an inner magnet ring fixed to said shaft, said inner and outer magnet rings being aligned to generate a magnetic flux field therebetween;
   (e) an electromagnetic transducer fixed to said inner magnet ring for sensing the change in the magnetic flux field generated between said outer and inner magnetic rings as a result of the rotation from alignment of said drum in response to said displacer and converting said change into an electrical signal; and
   (f) means for rotating said shaft in response to said electrical signal so as to move said shaft in the direction of movement of said drum to realign the outer and inner magnet rings to obtain an indication of the value of level of the liquid sensed.

2. A level gauge apparatus according to claim 1 in which each of said coupling outer and inner magnet rings is provided with N and S poles which are provided by alternately magnetizing said coupling outer and inner magnet rings along the circumferential direction thereof.

3. A level gauge apparatus according to claim 2, in which said electromagnetic transducer is fixed to the outer periphery of boundary portion of said coupling inner magnet ring between said N and S poles.

4. A level gauge apparatus according to claim 1, in which said rotating means for rotating said detection shaft is formed of a motor, a drive shaft rotated by said motor, a worm gear formed on said drive shaft and a worm gear wheel fixed to said detection shaft and meshed with said worm gear.

5. A level gauge apparatus according to claim 4 further comprising a servo amplifier for amplifying said electrical signal which is then supplied to said motor.

6. A level gauge apparatus according to claim 5 further comprising a slip ring through which the output from said electromagnetic transducer is supplied to said servo amplifier.

7. A level gauge apparatus according to claim 4 further comprising indicator means which is driven by said drive shaft through a belt so as to indicate thereon the sensed value of said liquid level when said displacer is settled.

8. A level gauge apparatus according to claim 7 in which said indicator means is a counter.

9. A level gauge apparatus according to claim 1, in which said electromagnetic transducer is a Hall element.

10. A level gauge apparatus according to claim 9, in which said Hall element is provided with a pair of input terminals and a pair of output terminals.

11. A level gauge apparatus according to claim 10, in which said input terminals of the Hall element are supplied with a control signal.

* * * * *